(12) United States Patent
Yang et al.

(10) Patent No.: US 12,155,828 B2
(45) Date of Patent: Nov. 26, 2024

(54) DEVICE AND METHOD FOR CODING VIDEO DATA FOR GEOMETRIC PARTITIONING MODE

(71) Applicant: SHARP KABUSHIKI KAISHA, Sakai (JP)

(72) Inventors: Yu-Chiao Yang, Taipei (TW); Chih-Yu Teng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/510,445

(22) Filed: Nov. 15, 2023

(65) Prior Publication Data

US 2024/0089432 A1 Mar. 14, 2024

Related U.S. Application Data

(63) Continuation of application No. 17/670,179, filed on Feb. 11, 2022, now abandoned, which is a
(Continued)

(51) Int. Cl.
*H04N 11/02* (2006.01)
*H04N 19/119* (2014.01)
(Continued)

(52) U.S. Cl.
CPC ......... *H04N 19/119* (2014.11); *H04N 19/176* (2014.11); *H04N 19/184* (2014.11)

(58) Field of Classification Search
CPC .................................................. H04N 19/119
(Continued)

(56) References Cited

U.S. PATENT DOCUMENTS

2002/0176500 A1\* 11/2002 Bakhmutsky ........ H04N 19/105
375/E7.176
2009/0238274 A1\* 9/2009 Chujoh ................ H04N 19/139
375/E7.243
(Continued)

FOREIGN PATENT DOCUMENTS

WO WO-2008016609 A2 \* 2/2008 ........... H04N 19/117
WO 2018037853 A1 3/2018
(Continued)

OTHER PUBLICATIONS

Deng (Bytedance) Z et al: "CE4-1.14 related: Block size limitation of enabling TPM and GEO", JVET-P0663, Joint Video Experts Team (JVET) of ITU-T SG 16 WP 3 and ISO/IECJTC 1/SC 29/WGII, 16th Meeting: Geneva, CH, Oct. 1-11, 2019 (Oct. 9, 2019).
(Continued)

*Primary Examiner* — Leron Beck
(74) *Attorney, Agent, or Firm* — ScienBiziP, P.C.

(57) ABSTRACT

A method of decoding a bitstream by an electronic device is provided. The method receives an image frame of a bitstream and determines a block unit having a block width and a block height based on the received image frame. The method determines whether a geometric partitioning mode is disabled for the block unit based on a comparison between the block width and the block height. The method divides the block unit to generate multiple sub-blocks predicted by different merge candidates of the block unit when the geometric partitioning mode is enabled and applied on the block unit. The predicted block is generated by predicting block unit based on a prediction mode different from the geometric partitioning mode when the geometric partitioning mode is disabled for the block unit. The method them reconstructs the block unit based on the predicted block.

17 Claims, 6 Drawing Sheets

Related U.S. Application Data continuation of application No. 17/138,795, filed on Dec. 30, 2020, now Pat. No. 11,284,078.

(60) Provisional application No. 62/955,228, filed on Dec. 30, 2019.

(51) Int. Cl.
*H04N 19/176* (2014.01)
*H04N 19/184* (2014.01)

(58) Field of Classification Search
USPC .................................. 375/240.01–240.29
See application file for complete search history.

(56) References Cited

U.S. PATENT DOCUMENTS

| | | | | |
|---|---|---|---|---|
| 2010/0118959 | A1* | 5/2010 | Lou | H04N 19/196 375/E7.076 |
| 2010/0208827 | A1* | 8/2010 | Divorra Escoda | H04N 19/176 375/240.24 |
| 2010/0316257 | A1* | 12/2010 | Xu | G06V 10/255 382/103 |
| 2011/0142133 | A1* | 6/2011 | Takahashi | H04N 19/61 375/E7.125 |
| 2012/0147961 | A1* | 6/2012 | Guo | H04N 19/17 375/240.16 |
| 2012/0189055 | A1* | 7/2012 | Chien | H04N 19/196 375/E7.125 |
| 2013/0070854 | A1* | 3/2013 | Wang | H04N 19/176 375/E7.125 |
| 2013/0101042 | A1* | 4/2013 | Sugio | H04N 19/149 375/E7.123 |
| 2013/0107959 | A1* | 5/2013 | Park | H04N 19/51 375/240.15 |
| 2013/0114717 | A1* | 5/2013 | Zheng | H04N 19/96 375/240.14 |
| 2013/0202038 | A1* | 8/2013 | Seregin | H04N 19/52 375/240.15 |
| 2014/0185664 | A1* | 7/2014 | Van Der Auwera | H04N 19/33 375/240.02 |
| 2014/0192883 | A1* | 7/2014 | Seregin | H04N 19/33 375/240.16 |
| 2019/0158828 | A1 | 5/2019 | Chang et al. | |
| 2019/0342546 | A1 | 11/2019 | Lin et al. | |
| 2020/0137387 | A1* | 4/2020 | Zhao | H04N 19/119 |
| 2020/0396448 | A1* | 12/2020 | Furht | H04N 19/105 |
| 2020/0404267 | A1* | 12/2020 | Liao | H04N 19/52 |
| 2021/0168409 | A1* | 6/2021 | Furht | H04N 19/96 |

FOREIGN PATENT DOCUMENTS

| | | |
|---|---|---|
| WO | 2019129166 A1 | 7/2019 |
| WO | 2021129694 A1 | 7/2021 |

OTHER PUBLICATIONS

L. Xu et al., "On Modifications of GEO", JVET-P0248-v3, Joint Video Experts Team (JVET) of ITU-T SG 16 WP 3 and ISO/IEC JTC 1/SC 29/WG 11, 16th Meeting: Geneva, CH, Oct. 1-11, 2019.

* cited by examiner

DEVICE AND METHOD FOR CODING VIDEO DATA FOR GEOMETRIC PARTITIONING MODE

CROSS-REFERENCE TO RELATED APPLICATION(S)

This application is a continuation application of U.S. patent application Ser. No. 17/670,179, filed on Feb. 11, 2022, entitled "Device and Method for Coding Video Data for Geometric Partitioning Mode," which is a continuation application of U.S. patent application Ser. No. 17/138,795, filed on Dec. 30, 2020, entitled "Device and Method for Coding Video Data," which claims the benefit of and priority to U.S. Provisional Patent Application Ser. No. 62/955,228, filed on Dec. 30, 2019, entitled "Adjustment of Partition Candidates for Geometric Partition Prediction," the contents of all of which are hereby incorporated herein fully by reference in their entirety for all purposes.

FIELD

The present disclosure is generally related to video coding, and specifically, to techniques for determining, based on a ratio value between a width and a height of a block unit in an image frame, whether the block unit is predicted by a geometric partitioning mode.

BACKGROUND

Geometric partitioning mode is a coding tool in a video coding method. In the geometric partitioning mode, an encoder may select two of multiple merge candidates for predicting a block unit in an image frame and provide two merge indices into a bitstream for a decoder to recognize the selected merge candidates.

The encoder and the decoder may split the block unit in the image frame along a partition line to generate multiple sub-blocks when the geometric partitioning mode is applied on the block unit. Some of the sub-blocks may be predicted based on only one of the two merge candidates, and other of the sub-blocks may be predicted based on both of the two merge candidates. Therefore, the encoder needs to select a prediction result of the block unit from multiple candidate results including a geometric result when the encoder tries multiple prediction modes including the geometric partitioning mode for predicting the block unit.

However, it is too complex for the encoder to predict the block unit in the geometric partitioning mode to generate the geometric result by selecting the partition line from multiple candidate lines and selecting the two merge candidates from the multiple merge candidates. Therefore, in order to decrease the complexity of the encoding process, it may be important for the encoder to restrict the usage of the geometric partitioning mode for predicting the block unit. The decoder also needs to know how to determine that the geometric partitioning mode is disabled.

SUMMARY

The present disclosure is directed to a device and method for determining whether the geometric partitioning mode is applied on a block unit based on a comparison between a width and a height of the block unit.

In a first aspect of the present disclosure, a method for decoding a bitstream and an electronic device for performing the method are provided. The method includes receiving an image frame of the bitstream; determining a block unit having a block width and a block height from the received image frame; determining whether a geometric partitioning mode is disabled for the block unit based on a comparison between the block width and the block height, the block unit being divided to generate multiple sub-blocks predicted by different merge candidates of the block unit when the geometric partitioning mode is enabled and applied on the block unit; generating the predicted block by predicting the block unit based on a prediction mode different from the geometric partitioning mode when the geometric partitioning mode is disabled for the block unit; and reconstructing the block unit based on the predicted block.

In a second aspect of the present disclosure, a method for decoding a bitstream and an electronic device for performing the method are provided. The method includes receiving an image frame of the bitstream; determining a block unit having a block width and a block height from the received image frame; determining a comparison between the block width and the block height; generating a predicted block by predicting the block unit based on a first prediction mode different from a geometric partitioning mode when the comparison between the block width and the block height indicates that a ratio value between the block width and the block height is greater than or equal to a threshold value, the block unit being divided to generate multiple sub-blocks each predicted by different merge candidates of the block unit when the geometric partitioning mode is enabled and applied on the block unit; and reconstructing the block unit based on the predicted block.

In a third aspect of the present disclosure, a method of decoding a bitstream by an electronic device is provided. The method includes receiving an image frame of the bitstream; determining a block unit having a block width and a block height based on the received image frame; determining whether a geometric partitioning mode is disabled for the block unit based on a comparison between the block width and the block height, wherein: the geometric partitioning mode is disabled for the block unit when the comparison between the block width and the block height indicates that a ratio value between the block width and the block height is greater than or equal to a threshold value, the geometric partitioning mode is not disabled when the comparison between the block width and the block height indicates that the ratio value is less than the threshold value, the block width is compared with a first magnified value generated by multiplying the block height by the threshold value, the block height is compared with a second magnified value generated by multiplying the block width by the threshold value, the comparison between the block width and the block height indicates that the ratio value is less than the threshold value when the block width is less than the first magnified value and the block height is less than the second magnified value, the comparison between the block width and the block height indicates that the ratio value is greater than or equal to the threshold value when the block width is greater than or equal to the first magnified value, the comparison between the block width and the block height indicates that the ratio value is greater than or equal to the threshold value when the block height is greater than or equal to the second magnified value, the threshold value is equal to 8, if the block width is equal to 64 and the block height is equal to one of 128, 64, 32, or 16, the geometric partitioning mode is not disabled, if the block width is equal to 64 and the block height is equal to 8, the geometric partitioning mode is disabled, if the block height is equal to 64 and the block width is equal to one of 128, 64, 32, or 16, the geometric partitioning mode is not disabled, if the block height is equal to 64 and the block width is equal to 8, the geometric partitioning mode is disabled, and the block unit is divided to generate multiple sub-blocks predicted by different merge candidates of the block unit when the geometric partitioning mode is applied on the block unit; generating a predicted block by predicting the block unit based on a prediction mode different from the geometric partitioning mode when the geometric partitioning mode is disabled for the block unit; and reconstructing the block unit based on the predicted block.

In a fourth aspect of the present disclosure, a method for decoding a bitstream by an electronic device is provided. The method includes receiving an image frame of the bitstream; determining a block unit having a block width and a block height based on the received image frame; determining a comparison between the block width and the block height, wherein: the geometric partitioning mode is disabled for the block unit when the comparison between the block width and the block height indicates that a ratio value between the block width and the block height is greater than or equal to a threshold value, the geometric partitioning mode is not disabled when the comparison between the block width and the block height indicates that the ratio value is less than the threshold value, the block width is compared with a first magnified value generated by multiplying the block height by the threshold value, the block height is compared with a second magnified value generated by multiplying the block width by the threshold value, the comparison between the block width and the block height indicates that the ratio value is less than the threshold value when the block width is less than the first magnified value and the block height is less than the second magnified value, the comparison between the block width and the block height indicates that the ratio value is greater than or equal to the threshold value when the block width is greater than or equal to the first magnified value, the comparison between the block width and the block height indicates that the ratio value is greater than or equal to the threshold value when the block height is greater than or equal to the second magnified value, the threshold value is equal to 8, if the block width is equal to 64 and the block height is equal to one of 128, 64, 32, or 16, the geometric partitioning mode is not disabled, if the block width is equal to 64 and the block height is equal to 8, the geometric partitioning mode is disabled, if the block height is equal to 64 and the block width is equal to one of 128, 64, 32, or 16, the geometric partitioning mode is not disabled, and if the block height is equal to 64 and the block width is equal to 8, the geometric partitioning mode is disabled; generating a predicted block by predicting the block unit based on a first prediction mode different from a geometric partitioning mode when the comparison between the block width and the block height indicates that a ratio value between the block width and the block height is greater than or equal to a threshold value, wherein the block unit is divided to generate multiple sub-blocks predicted by different merge candidates of the block unit when the geometric partitioning mode is applied on the block unit; and reconstructing the block unit based on the predicted block.

In a fifth aspect of the present disclosure, an electronic device for decoding a bitstream is provided. The electronic device includes at least one processor; and at least one non-transitory computer-readable medium coupled to the at least one processor. The at least one non-transitory computer-readable medium storing one or more computer-executable instructions that, when executed by the at least one processor, cause the electronic device to: receive an image frame of a bitstream; determine a block unit having a block width and a block height based on between the block width and the block height, wherein: the geometric partitioning mode is disabled for the block unit when the comparison between the block width and the block height indicates that a ratio value between the block width and the block height is greater than or equal to a threshold value, the geometric partitioning mode is not disabled when the comparison between the block width and the block height indicates that the ratio value is less than the threshold value, the block width is compared with a first magnified value generated by multiplying the block height by the threshold value, the block height is compared with a second magnified value generated by multiplying the block width by the threshold value, the comparison between the block width and the block height indicates that the ratio value is less than the threshold value when the block width is less than the first magnified value and the block height is less than the second magnified value, the comparison between the block width and the block height indicates that the ratio value is greater than or equal to the threshold value when the block width is greater than or equal to the first magnified value, the comparison between the block width and the block height indicates that the ratio value is greater than or equal to the threshold value when the block height is greater than or equal to the second magnified value, the threshold value is equal to 8, if the block width is equal to 64 and the block height is equal to one of 128, 64, 32, or 16, the geometric partitioning mode is not disabled, if the block width is equal to 64 and the block height is equal to 8, the geometric partitioning mode is disabled, if the block height is equal to 64 and the block width is equal to one of 128, 64, 32, or 16, the geometric partitioning mode is not disabled, and if the block height is equal to 64 and the block width is equal to 8, the geometric partitioning mode is disabled; generate a predicted block by predicting the block unit based on a first prediction mode different from a geometric partitioning mode when the comparison between the block width and the block height indicates that a ratio value between the block width and the block height is greater than or equal to a threshold value, wherein the block unit is divided to generate multiple sub-blocks predicted by different merge candidates of the block unit when the geometric partitioning mode is applied on the block unit; and reconstruct the block unit based on the predicted block.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
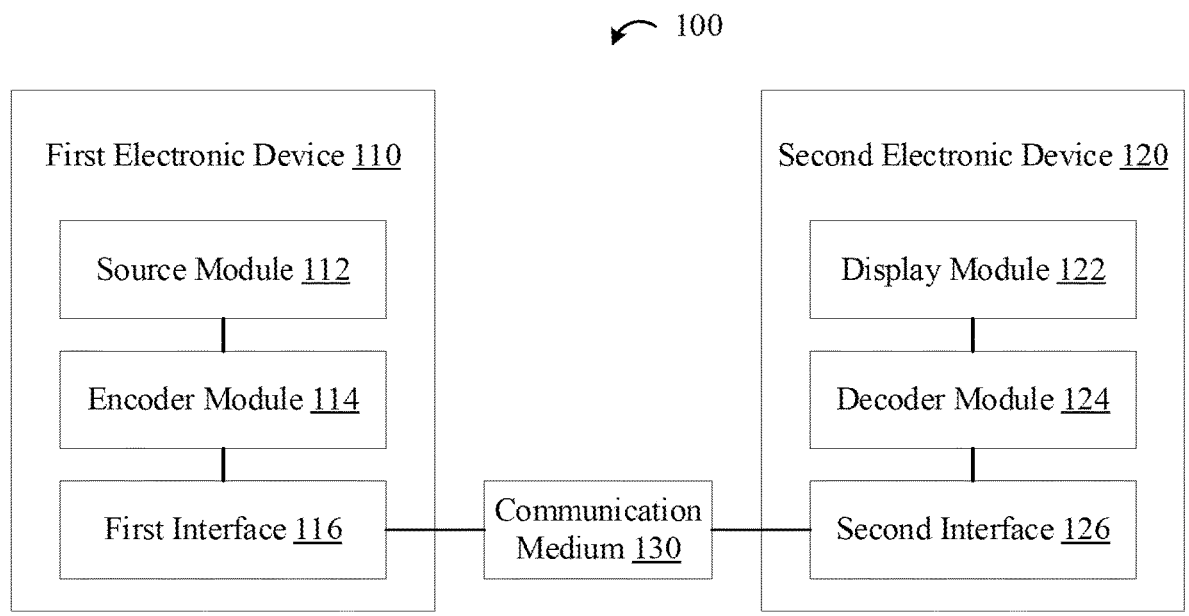
FIG. 1 is a block diagram illustrating a system configured to encode and decode video data, according to an example implementation of the present disclosure.

The following disclosure contains specific information pertaining to example implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purpose of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series and the equivalent.

For purposes of explanation and non-limitation, specific details such as functional entities, techniques, protocols, and standards are set forth for providing an understanding of the disclosed technology. In other examples, detailed disclosure of well-known methods, technologies, systems and architectures are omitted so as not to obscure the present disclosure with unnecessary details.

Persons skilled in the art will immediately recognize that any disclosed coding function(s) or algorithm(s) described in the present disclosure may be implemented by hardware, software or a combination of software and hardware. Disclosed functions may correspond to modules that are software, hardware, firmware, or any combination thereof.

A software implementation may include a program having computer-executable instructions stored on computer-readable medium such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or using one or more digital signal processors (DSPs). Although some of the disclosed implementations are oriented to software installed and executing on computer hardware, alternative implementations implemented as firmware or as hardware or combination of hardware and software are well within the scope of the present disclosure. The computer-readable medium includes but is not limited to random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram illustrating a system configured to encode and decode video data, according to an example implementation of the present disclosure. The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and to decode the encoded video data.

In at least one implementation, the first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

In at least one implementation, the first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include more or less components than illustrated or have a different configuration of the various illustrated components.

In at least one implementation, the source module 112 may include a video capture device to capture new video, a video archive to store previously captured video, and/or a video feed interface to receive the video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

In at least one implementation, the encoder module 114 and the decoder module 124 may each be implemented as any of a variety of suitable encoder/decoder circuitry such as one or more microprocessors, a central processing unit (CPU), a graphic processing unit (GPU), a system on chip (SoC), digital signal processors (DSPs), application-specific integrated circuits (ASICs), field-programmable gate arrays (FPGAs), discrete logic, software, hardware, firmware or any combinations thereof. When implemented partially in software, a device may store the program having instructions for the software in a suitable, non-transitory computer-readable medium and execute the stored instructions using one or more processors to perform the disclosed methods. In at least one implementation, each of the encoder module 114 and the decoder module 124 may be included in one or more encoders or decoders, any of which may be integrated as part of a combined encoder/decoder (CODEC) in a device.

In at least one implementation, the first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). In at least one implementation, the first interface 116 and the second interface 126 may each include any device configured to transmit a compliant video bitstream via the communication medium 130 and to receive the compliant video bitstream via the communication medium 130.

In at least one implementation, the first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure(s) that may be used to interconnect peer devices.

In at least one implementation, the display module 122 may include a display using liquid crystal display (LCD) technology, plasma display technology, organic light-emitting diode (OLED) display technology, or light-emitting polymer display (LPD) technology with other display technologies used in some other implementations. The display module 122 may include a High-Definition display or an Ultra-High-Definition display.

Figure 2:
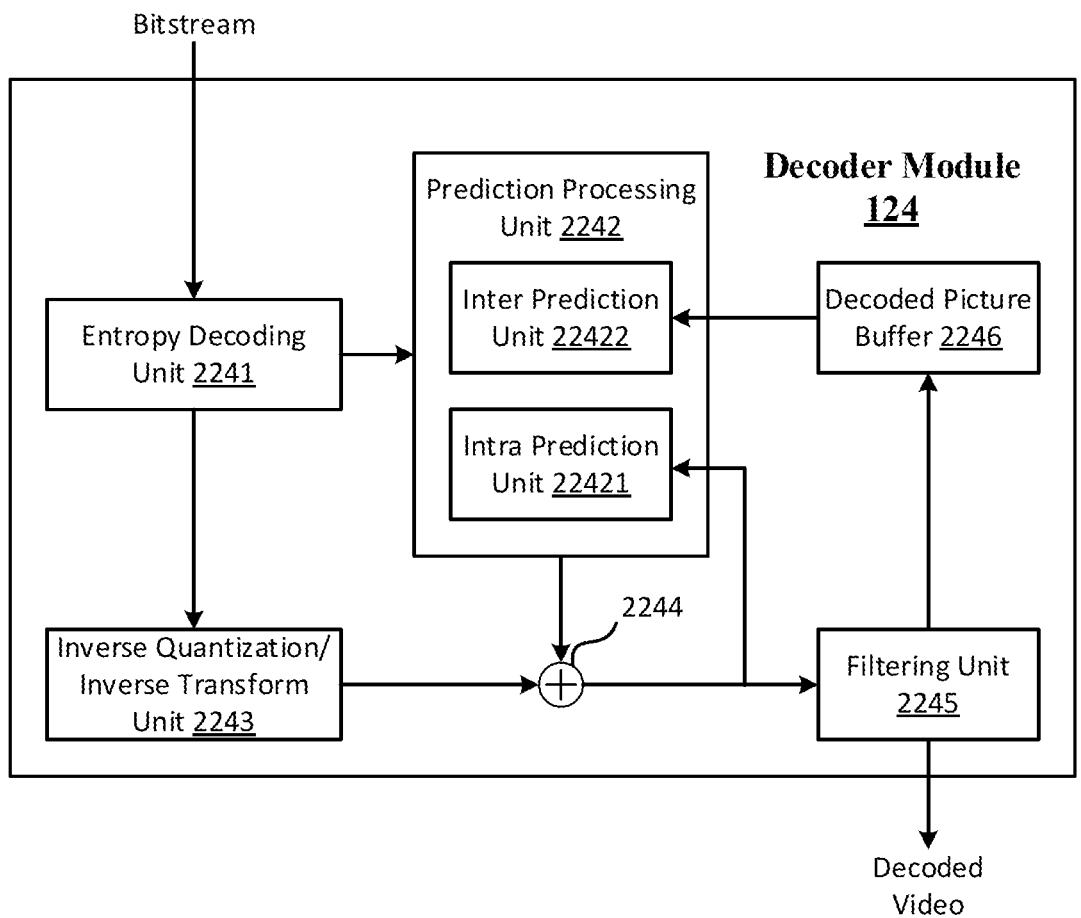
FIG. 2 is a block diagram illustrating the decoder module of the second electronic device illustrated in FIG. 1, according to an example implementation of the present disclosure.

FIG. 2 is a block diagram illustrating the decoder module 124 of the second electronic device 120 illustrated in FIG. 1, according to an example implementation of the present disclosure. The decoder module 124 includes an entropy decoder (e.g., entropy decoding unit 2241), a prediction processor (e.g., prediction processing unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction processing unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

In at least one implementation, the entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

In at least one implementation, the prediction processing unit 2242 may receive syntax elements such as motion vectors, intra modes, partition information, and other syntax information from the entropy decoding unit 2241. The prediction processing unit 2242 may receive the syntax elements including the partition information and divide image frames according to the partition information.

In at least one implementation, each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction processing unit 2242 may receive predicted data including the intra mode or the motion vector for a current image block of a specific one of the image frames. The current image block may be the luminance block or one of the chrominance blocks in the specific image frame.

In at least one implementation, the intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. In at least one implementation, the intra prediction unit 22421 may reconstruct multiple chroma components of the current block unit based on multiple luma components of the current block unit when the chroma components are reconstructed by the prediction processing unit 2242.

In at least one implementation, the intra prediction unit 22421 may reconstruct multiple chroma components of the current block unit based on the multiple luma components of the current block unit when the luma components of the current block are reconstructed by the prediction processing unit 2242.

In at least one implementation, the inter prediction unit 22422 may perform inter-predictive coding of the current block unit relative to one or more blocks in one or more reference image blocks based on syntax elements related to the motion vector in order to generate the predicted block.

In at least one implementation, the motion vector may indicate a displacement of the current block unit within the current image block relative to a reference block unit within the reference image block. The reference block unit is a block determined to closely match the current block unit.

In at least one implementation, the inter prediction unit 22422 may receive the reference image block stored in the decoded picture buffer 2246 and reconstruct the current block unit based on the received reference image blocks.

In at least one implementation, the inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

In at least one implementation, the inverse transformation may be inversely applied by the transformation process, such as a discrete cosine transform (DCT), a discrete sine transform (DST), an adaptive multiple transform (AMT), a mode-dependent non-separable secondary transform (MDNSST), a hypercube-givens transform (HyGT), a signal-dependent transform, a Karhunen-Loéve transform (KLT), a wavelet transform, an integer transform, a sub-band transform, or a conceptually similar transform.

In at least one implementation, the inverse transformation may convert the residual information from a transform domain, such as a frequency domain, back to the pixel domain. In at least one implementation, the degree of inverse quantization may be modified by adjusting a quantization parameter. The summer 2244 adds the residual block to the predicted block from the prediction processing unit 2242 to produce a reconstructed block.

In at least one implementation, the summer 2244 adds the reconstructed residual block to the predicted block provided by the prediction processing unit 2242 to produce a reconstructed block.

In at least one implementation, the filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF. Such filters are not explicitly illustrated for brevity but may filter the output of the summer 2244.

The filtering unit 2245 may output the decoded video to the display module 122 or other video receiving units after the filtering unit 2245 performs the filtering process for the reconstructed blocks of the specific image frame.

In at least one implementation, the decoded picture buffer 2246 may be a reference picture memory that stores the reference block to be used by the prediction processing unit 2242 in decoding the bitstream (e.g., in inter-coding modes). The decoded picture buffer 2246 may be formed by any of a variety of memory devices such as dynamic random-access memory (DRAM), including synchronous DRAM (SDRAM), magneto-resistive RAM (MRAM), resistive RAM (RRAM), or other types of memory devices.

In at least one implementation, the decoded picture buffer 2246 may be on-chip with other components of the decoder module 124 or off-chip relative to those components.

Figure 3:
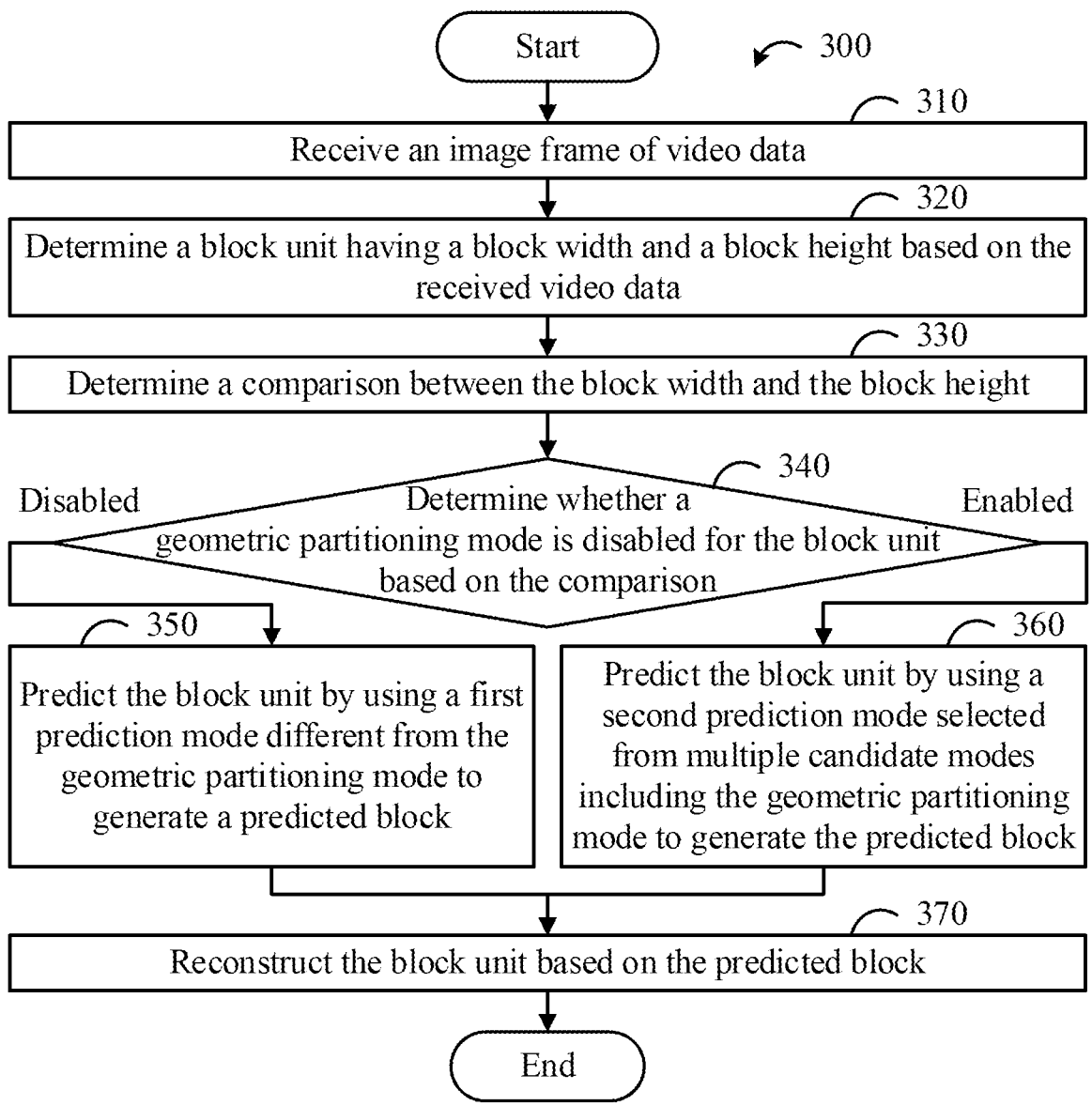
FIG. 3 is a flowchart illustrating a method for encoding and decoding video data by an electronic device, according to an example implementation of the present disclosure.

FIG. 3 is a flowchart illustrating a method 300 for encoding and decoding video data by an electronic device, according to an example implementation of the present disclosure. The method 300 is an example only as there are a variety of ways to perform the method.

The method 300 for decoding a bitstream and reconstructing a block unit may be performed using the configurations illustrated in FIG. 1 and FIG. 2 and various elements of these figures are referenced with regard to the method 300. Each block illustrated in FIG. 3 may represent one or more processes, methods, or subroutines performed.

The order of blocks in FIG. 3 is illustrative only and may be different from what is illustrated. Additional blocks may be added or less blocks may be utilized without departing from the present disclosure.

At block 310, the decoder module 124 receives an image frame of video data. The video data may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

In at least one implementation, the entropy decoding unit 2241 may decode the bitstream to determine multiple prediction indications and multiple partitioning indications for the image frame and the decoder module 124 may further reconstruct the image frame based on the prediction indications and the partitioning indications. The prediction indications and the partitioning indications may include multiple flags and multiple indices.

At block 320, the decoder module 124 determines a block unit having a block width and a block height based on the received video data. With further reference to FIG. 1 and FIG. 2, the decoder module 124 may divide the image frame to determine the block unit according to the partition indications included in the bitstream. For example, the decoder module 124 may divide the image frames to generate multiple coding tree units and may further divide one of the coding tree units to determine the block unit according to the partition indications (e.g., based on a video coding standard).

Figure 4A:
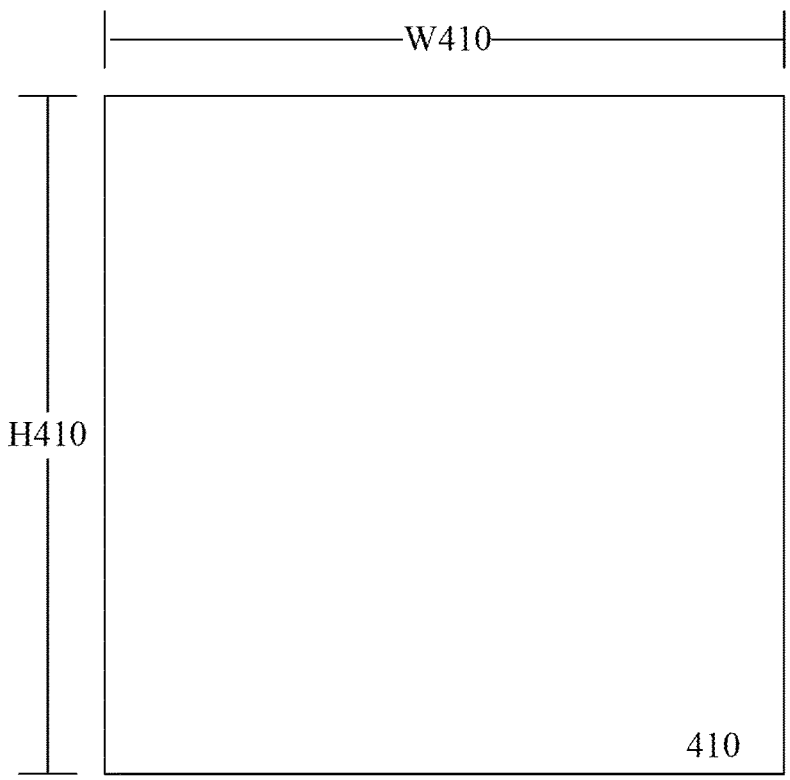
FIGS. 4A-4C are schematic illustrations of a block unit having different block sizes, according to example implementations of the present disclosure.
Figure 4C:
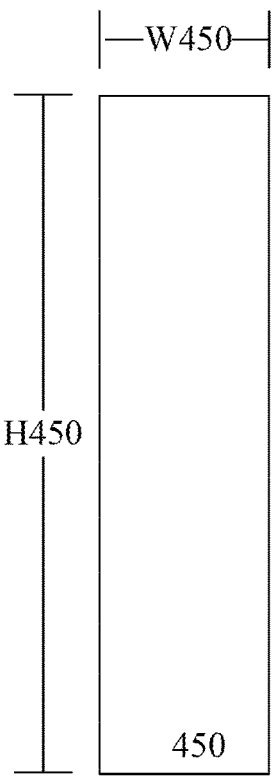
Figure 4B:
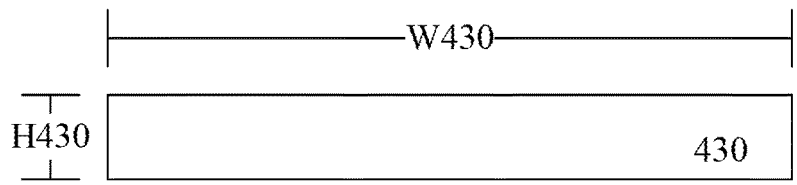

FIGS. 4A-4C are schematic illustrations of a block unit having different block sizes according to example implementations of the present disclosure. In at least one implementation, a block size of the block unit may include a block height Hb and a block width Wb. For example, the block size of the block unit 410 includes the block height H410 and the block width W410, the block size of the block unit 430 includes the block height H430 and the block width W430, and the block size of the block unit 450 includes the block height H450 and the block width W450. In some implementations, the block height H410 may be equal to the block width W410, the block width W430 may be equal to 8×H430, and the block height H450 may be equal to 4×W450.

At block 330, the decoder module 124 determines a comparison between the block width and the block height. With further reference to FIG. 1 and FIG. 2, the decoder module 124 may determine the comparison between the block width and the block height based on an inequality.

For example, a ratio value R between the block width Wb and the block height Hb may be greater than or equal to a threshold value T (i.e., R≥T). In some implementations, the ratio value R between the width Wb and the block height Hb may be less than the threshold value T (i.e., R<T). In some other implementations, the ratio value R between the width Wb and the block height Hb may be greater than the threshold value T (i.e., R>T). In yet other implementations, the ratio value R between the width Wb and the block height Hb may be less than or equal to the threshold value T (i.e., R<T).

In at least one implementation, the decoder module 124 may determine a ratio parameter RP computed based on the block width Wb and the block height Hb. In at least one implementation, a first ratio parameter RP1 may be computed based on division. In some implementations, the first ratio parameter RP1 may be computed by dividing the block width Wb by the block height Hb (i.e., RP1=Wb/Hb) when the block width Wb is greater than or equal to the block height Hb. The first ratio parameter RP1 may be computed by dividing the block height Hb by the block width Wb (i.e., RP1=Hb/Wb) when the block width Wb is less than the block height Hb. In some other implementations, the first ratio parameter RP1 may be computed by dividing the block width Wb by the block height Hb, when the block width Wb is greater than the block height Hb. Therefore, the first ratio parameter RP1 may be computed by dividing the block height Hb by the block width Wb, when the block width Wb is less than or equal to the block height Hb.

In at least one implementation, the second ratio parameter RP2 may be computed based on the block width Wb and the block height Hb by a logarithmic equation. In some implementations, one of the first ratio parameter RP1 and the second ratio parameter RP2 computed by different formulas may be set as the ratio parameter RP of the block unit. In at least one implementation, the second ratio parameter RP2 may be equal to an absolute value of a difference value generated by subtracting a base-2 logarithm of the block height from a base-2 logarithm of the block width (i.e., RP2=abs (log 2 Wb−log 2 Hb)). In other words, the second ratio parameter RP2 may be equal to the absolute value of a base-2 logarithm of a quotient value, and the quotient value is generated by dividing the block width Wb by the block height Hb or dividing the block height Hb by the block width Wb (i.e., RP2=abs (log 2 Wb−log 2 Hb)=abs (log 2 (Wb/Hb))=abs (log 2 (Hb/Wb))). The first ratio parameter RP1 may be equal to two to the power of the second ratio parameter RP2.

In at least one implementation, the decoder module 124 may compare the ratio parameter RP with a ratio threshold RT. The decoder module 124 may determine that the comparison indicates that the ratio value R is greater than the threshold value T when the ratio parameter RP is greater than the ratio threshold RT. The decoder module 124 may determine that the comparison indicates that the ratio value R is equal to the threshold value T when the ratio parameter RP is equal to the ratio threshold RT. The decoder module 124 may determine that the comparison indicates that the ratio value R is less than the threshold value T when the ratio parameter RP is less than the ratio threshold RT.

In at least one implementation, the decoder module 124 may compare the ratio parameter RP with a first ratio threshold RT1 when the first ratio parameter RP1 is set as the ratio parameter RP. In some implementations, the decoder module 124 may determine that the comparison indicates that the ratio value R is greater than or equal to the threshold value T when the first ratio parameter RP1 is greater than or equal to the first ratio threshold RT1. The decoder module 124 may determine that the comparison indicates that the ratio value R is less than the threshold value T when the first ratio parameter RP1 is less than the first ratio threshold RT1. In some other implementations, the decoder module 124 may determine that the comparison indicates that the ratio value R is less than or equal to the threshold value T when the first ratio parameter RP1 is less than or equal to the first ratio threshold RT1. In at least one implementation, the first ratio threshold RT1 may be a positive integer.

In at least one implementation, the first ratio threshold RT1 may be equal to two to the power of n, and the number n is a positive integer. The first ratio threshold RT1 may be preset to 1, 2, 4 or 8. For example, the first ratio parameter RP1 of the block unit 410 equal to 1 and the first ratio parameter RP1=H450/W450 of the block unit 450 equal to 4 are less than the first ratio threshold RT1 when the first ratio threshold RT1 is equal to 8. The first ratio parameter RP1=W430/H430 of the block unit 430 equal to 8 is not less than the first ratio threshold RT1 when the first ratio threshold RT1 is equal to 8.

In at least one implementation, the decoder module 124 may compare the ratio parameter RP with a second ratio threshold RT2 when the second ratio parameter RP2 is set as the ratio parameter RP. The decoder module 124 may determine that the comparison indicates that the ratio value R is greater than or equal to the threshold value T when the second ratio parameter RP2 is greater than or equal to the second ratio threshold RT2. The decoder module 124 may determine that the comparison indicates that the ratio value R is less than the threshold value T when the second ratio parameter RP2 is less than the second ratio threshold RT2. The decoder module 124 may determine that the comparison indicates that the ratio value R is less than or equal to the threshold value T when the second ratio parameter RP2 is less than or equal to the second ratio threshold RT2.

In at least one implementation, the second ratio threshold RT2 may be a positive integer. The second ratio threshold RT2 may be preset to 1, 2, 3 or 4. For example, the second ratio parameter RP2 of the block unit 410 equal to 0 and the second ratio parameter RP2 of the block unit 450 equal to 2 are less than the second ratio threshold RT2 when the second ratio threshold RT2 is equal to 3. The second ratio parameter RP2 of the block unit 430 equal to 3 is not less than the second ratio threshold RT2 when the second ratio threshold RT2 is equal to 3.

In at least one implementation, the first ratio threshold RT1 may be equal to two to the power of the second ratio threshold RT2 since the first ratio parameter RP1 is equal to two to the power of the second ratio parameter RP2. Therefore, the result of the comparison may be unchanged when the decoder module 124 changes the comparison from a first inequality RP1<RT1 to a second inequality RP2<RT2.

In at least one implementation, the decoder module 124 may compare the block width Wb with a first magnified value N1 generated from the block height Hb and compare the block height Hb with a second magnified value N2 generated from the block width Wb when the decoder module 124 determines the comparison between the block width Wb and the block height Hb. The first magnified value N1 may be computed by multiplying the block height Hb by the threshold value T, and the second magnified value N2 may be computed by multiplying the block width Wb by the threshold value T (i.e., N1=T×Hb and N2=T×Wb).

In at least one implementation, the decoder module 124 may determine the comparison indicates that the ratio value R is less than the threshold value T when the block width Wb is less than the first magnified value N1 and the block height Hb is less than the second magnified value N2. The decoder module 124 may determine the comparison indicates that the ratio value R is greater than or equal to the threshold value T when the block width Wb is greater than or equal to the first magnified value N1. The decoder module 124 may determine the comparison indicates that the ratio value R is greater than or equal to the threshold value T when the block height Hb is greater than or equal to the second magnified value N2.

In at least one implementation, the threshold value T may be equal to the first ratio threshold RT1 when the decoder module 124 determines the comparison based on the first magnified value N1 and the second magnified value N2. The decoder module 124 may determine the comparison based on a third inequality Wb<N1=RT1×Hb and a fourth inequality Hb<N2=RT1×Wb.

In at least one implementation, the first ratio threshold RT1 may be preset to 1, 2, 4 or 8. Therefore, the threshold value T may be preset to 1, 2, 4 or 8 when the decoder module 124 determines the comparison based on the first magnified value N1 and the second magnified value N2. In at least one implementation, a first division value Hb/Wb may be less than 1 when the block width Wb is greater than the block height Hb. Therefore, the first division value Hb/Wb is also less than the threshold value T and the fourth inequality Hb<RT1×Wb is true when the block width Wb is greater than the block height Hb.

In other words, the comparison may only be influenced by the third inequality Wb<RT1×Hb when the block width Wb is greater than the block height Hb. Therefore, the comparison determined based on the first inequality RP1=Wb/Hb<RT1 is identical to the comparison determined based on the third inequality Wb<N1=RT1×Hb and the fourth inequality Hb<N2=RT1×Wb when the block width Wb is greater than the block height Hb.

In some other implementations, a second division value Wb/Hb may be less than 1 when the block width Wb is less than the block height Hb. Therefore, the second division value Wb/Hb is also less than the threshold value T and the third inequality Wb<RT1×Hb is true when the block width Wb is less than the block height Hb and the threshold value T is preset to 1, 2, 4 or 8.

In other words, the comparison may only be influenced by the fourth inequality Hb<RT1×Wb when the block width Wb is less than the block height Hb. Therefore, the comparison determined based on the first inequality RP1=Hb/Wb<RT1 is identical to the comparison determined based on the third inequality Wb<N1=RT1×Hb and the fourth inequality Hb<N2=RT1×Wb when the block width Wb is less than the block height Hb.

In some other implementations, the first division value and the second division value may be equal to 1 when the block width Wb is equal to the block height Hb. Therefore, the first division value and the second division value is less than the threshold value T and the third inequality and the fourth inequality is true when the block width Wb is equal to the block height Hb and the threshold value T is preset to 2, 4 or 8. Thus, the comparison determined based on the first inequality RP1=Hb/Wb<RT1 is identical to the comparison determined based on the third inequality Wb<N1=RT1×Hb and the fourth inequality Hb<N2=RT1×Wb when the block width Wb is equal to the block height Hb and the threshold value T is preset to 2, 4 or 8.

At block 340, the decoder module 124 determines whether a geometric partitioning mode is disabled for the block unit based on the comparison. The method 300 may proceed to block 350 when the decoder module 124 determines that the geometric partitioning mode is disabled for the block unit. The method may proceed to block 360 when the decoder module 124 determines the geometric partitioning mode is enabled for the block unit.

With further reference to FIG. 1 and FIG. 2, the decoder module 124 may determine that the geometric partitioning mode is disabled for the block unit when the comparison indicates that the ratio value R between the block width Wb and the block height Hb is greater than or equal to the threshold value T. The decoder module 124 may determine that the geometric partitioning mode is enabled for the block unit when the comparison indicates that the ratio value R between the block width Wb and the block height Hb is less than the threshold value T.

In at least one implementation, the decoder module 124 may determine the comparison between the block width and the block height to restrict the usage of the geometric partitioning mode. When the block unit is too narrow, the prediction results of different neighboring partition lines may be similar to each other. The block unit may be further divided along a horizontal direction or a vertical direction to generate two block units to be predicted respectively when the block unit is too narrow.

Therefore, the geometric partitioning mode may be disabled when the block unit is too narrow. For example, the geometric partitioning mode may be disabled when the block width is greater than or equal to T times the block height, or the block height is greater than or equal to T times the block width. In at least one implementation, the threshold value T may be equal to 2, 4 or 8.

In at least one implementation, the geometric partitioning mode may be disabled for the block unit when the decoder module 124 determines that the first ratio parameter RP1 is greater than or equal to the first ratio threshold RT1. The geometric partitioning mode may be enabled for the block unit when the decoder module 124 determines that the first ratio parameter RP1 is less than the first ratio threshold RT1.

For example, the first ratio threshold RT1 may be equal to eight. Therefore, the geometric partitioning mode may be disabled for the block unit when the first ratio parameter RP1 of the block unit is greater than or equal to 8.

In a general geometric partitioning mode, the block width Wb and the block height Hb are greater than or equal to 8. Therefore, the geometric partitioning mode may not be applied on the block unit having the block size 64×8 or 8×64 when the first ratio threshold RT1 is equal to eight. The geometric partitioning mode may not be applied on the block unit having the block size 64×8, 64×16, 32×8, 8×64, 16×64 or 8×32 when the first ratio threshold RT1 is equal to four.

In at least one implementation, the geometric partitioning mode may be disabled for the block unit when the decoder module 124 determines that the second ratio parameter RP2 is greater than or equal to the second ratio threshold RT2. The geometric partitioning mode may be enabled for the block unit when the decoder module 124 determines that the second ratio parameter RP2 is less than the second ratio threshold RT2.

For example, the geometric partitioning mode may not be applied on the block unit having the block size 64×8 or 8×64 when the second ratio threshold RT2 is equal to three. The geometric partitioning mode may not be applied on the block unit having the block size 64×8, 64×16, 32×8, 8×64, 16×64 or 8×32 when the second ratio threshold RT2 is equal to two.

In at least one implementation, the geometric partitioning mode may be disabled for the block unit when the decoder module 124 determines that the block width Wb is greater than or equal to the first magnified value N1. In some other implementations, the geometric partitioning mode may be disabled for the block unit when the decoder module 124 determines that the block height Hb is greater than or equal to the second magnified value N2. The geometric partitioning mode may be enabled for the block unit when the block width Wb is less than the first magnified value N1 and the block height Hb is less than the second magnified value N2.

For example, the geometric partitioning mode may not be applied on the block unit having the block size 64×8 or 8×64 when the threshold value T is equal to eight. In other words, the geometric partitioning mode may not be applied on the block unit having the block size 64×8 or 8×64 when the block width Wb is greater than or equal to the first magnified value 8×Hb or block height Hb is greater than or equal to the second magnified value 8×Wb. The geometric partitioning mode may not be applied on the block unit having the block size 64×8, 64×16, 32×8, 8×64, 16×64 or 8×32 when the block width Wb is greater than or equal to the first magnified value 4×Hb or block height Hb is greater than or equal to the second magnified value 4×Wb.

At block 350, the decoder module 124 predicts the block unit by using a first prediction mode different from the geometric partitioning mode to generate a predicted block.

With further reference to FIG. 1 and FIG. 2, the decoder module 124 may select the first prediction mode and predict the block unit based on the first prediction mode to generate the predicted block when the geometric partitioning mode is disabled for the block unit. The decoder module 124 may predict the block unit based on the first prediction mode to generate the predicted block when the comparison indicates that the ratio value R between the block width Wb and the block height Hb is greater than or equal to the threshold value T.

In at least one implementation, the first prediction mode may be selected from multiple option modes. Each of the option modes is different from the geometric partitioning mode.

In at least one implementation, the option modes may be determined for selecting the first prediction mode by a first merge index. Therefore, the first prediction mode may be the one of the option modes selected based on the first merge index.

In some implementations, the first merge index may indicate the first prediction mode included in a merge candidate list. In at least one implementation, the option modes may be multiple merge candidate modes in the merge candidate list determined from multiple spatial motion prediction modes of multiple neighboring blocks neighboring the block unit, multiple temporal motion prediction modes of multiple collocated blocks, history-based motion prediction modes stored in a first-in-first-out (FIFO) table, multiple pair-wise average motion prediction modes, and a zero motion mode.

In at least one implantation, the first prediction mode may indicate first motion information having a first reference frame and a first reference vector V0. The first reference frame may be selected from multiple reference lists. In at least one implementation, the first motion information may include a first list flag for determining one of the reference lists to select the first reference frame. In at least one implementation, multiple block components in the block unit may be predicted based on the first reference vector V0 and the first reference frame.

At block 360, the decoder module 124 predicts the block unit by using a second prediction mode selected from multiple candidate modes including the geometric partitioning mode to generate the predicted block. With further reference to FIG. 1 and FIG. 2, the decoder module 124 may select the second prediction mode and predict the block unit based on the second prediction mode to generate the predicted block when the geometric partitioning mode is enabled for the block unit. The decoder module 124 may predict the block unit based on the second prediction mode to generate the predicted block when the comparison indicates the ratio value R is less than the threshold value T.

In at least one implementation, the second prediction mode may be selected from the candidate modes. In some implementations, the candidate modes may include the geometric partitioning mode. In some implementations, the candidate modes may include the option modes and the geometric partitioning mode.

Figure 5A:
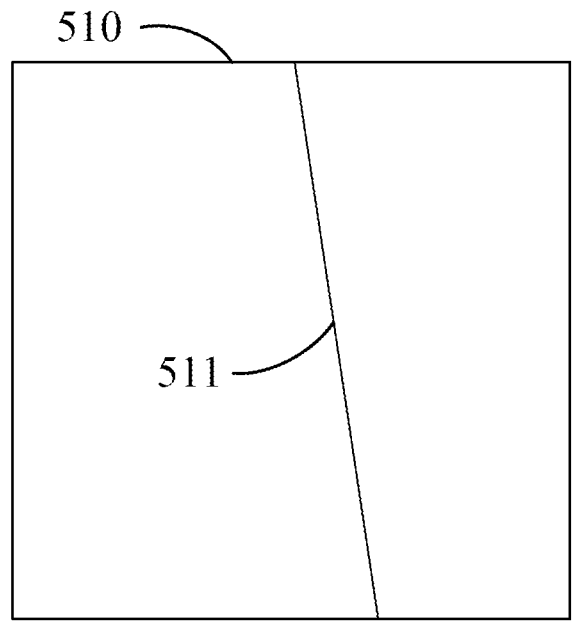
FIGS. 5A-5B are schematic illustrations of a block unit having different sub-blocks separated based on a partition line, according to example implementations of the present disclosure.
Figure 5B:
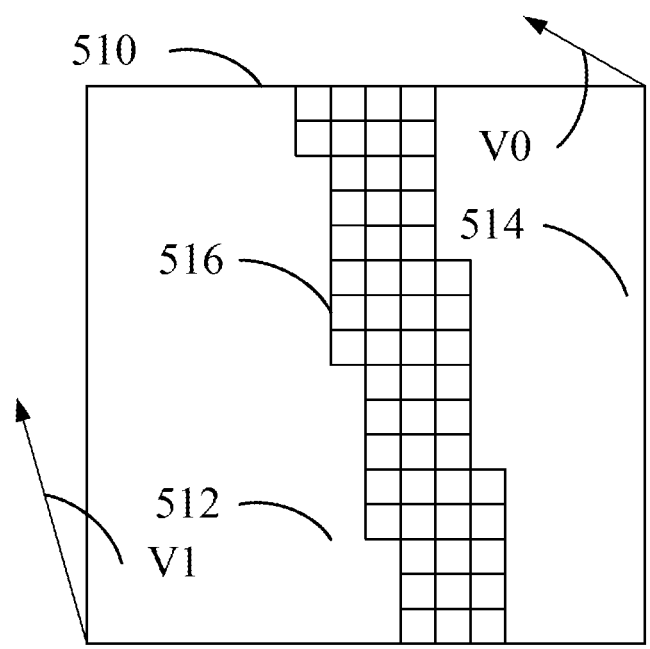

In at least one implementation, the decoder module 124 may determine a partition index, a second merge index and a third merge index of the block unit from the bitstream when the geometric partitioning mode is applied on the block unit for predicting the block unit. FIGS. 5A-5B are schematic illustrations of a block unit having different sub-blocks separated based on a partition line, according to example implementations of the present disclosure. The decoder module 124 may divide the block unit 510 to generate a first sub-block 512, a second sub-block 514 and a third sub-block 516 based on a partition line 511 determined from the partition index.

In at least one implementation, the partition index may indicate the partition line 511 of the block unit 510. In at least one implementation, the partition index may indicate a partition angle index and a partition distance index. The partition angle index may indicate a split angle of the partition line, and the partition distance index may indicate a split distance between the partition line and a center point of the block unit.

Therefore, the decoder module 124 may determine the partition line based on the split angle and the split distance indicated by the partition index. The bitstream may directly include the partition angle index and the partition distance index.

In at least one implementation, the decoder module 124 may predict the multiple sub-blocks 512, 514 and 516 based on second motion information and third motion information determined from the merge candidate modes by the second merge index and the third merge index. In at least one implementation, the second motion information indicated by the second merge index may be one of the merge candidate modes included in the merge candidate list, and the third motion information indicated by the third merge index may also be one of the merge candidate modes included in the merge candidate list. In at least one implantation, the second motion information may indicate a second reference frame and a second reference vector V1, and the third motion information may indicate a third reference frame and a third reference vector V2.

The second reference frame and the third reference frame may be selected from the multiple reference lists. In some implementations, the second reference frame and the third reference frame may be selected from the same one of the reference lists. In some other implementations, the second reference frame and the third reference frame may be selected from different reference lists. In at least one implementation, the reference lists may be set as L0 and L1 when the number of the reference lists may be equal to 2.

In at least one implementation, the second motion information may include a second list flag for selecting the second reference frame and the third motion information may include a third list flag for selecting the third motion information. In at least one implementation, the second reference frame and the third reference frame may be selected from the same reference list when the second list flag is equal to the third list flag. The second reference frame and the third reference frame may be selected from different reference lists when the second list flag is different from the third list flag.

In at least one implementation, multiple first sub-block components in the first sub-block 512 may be predicted based on the second reference vector V1 and the second reference frame. Multiple second sub-block components in the second sub-block 514 may be predicted based on the third reference vector V2 and the third reference frame. In addition, multiple third sub-block components in the third sub-block 516 may be predicted based on the second reference vector V1, the third reference vector V2, the second reference frame and the third reference frame. The third sub-block components in the third sub-block 516 may be predicted by deriving multiple first reference samples determined based on the second reference vector V1 and the second reference frame and multiple second reference samples determined based on the third reference vector V2 and the third reference frame and merging the second reference samples and the third reference samples based on multiple blending weights. In at least one implementation, the blending weights may be derived based on multiple component distances between the partition line 511 and the third sub-block components in the third sub-block 516.

At block 370, the decoder module 124 reconstructs the block unit based on the predicted block. With further reference to FIG. 1 and FIG. 2, the decoder module 124 may determine multiple residual components from the bitstream for the block unit, and add the residual components into the predicted block to reconstruct the block unit. The decoder module 222 may reconstruct all of the other block units in the image frame for reconstructing the image frame and the video.

Figure 6:
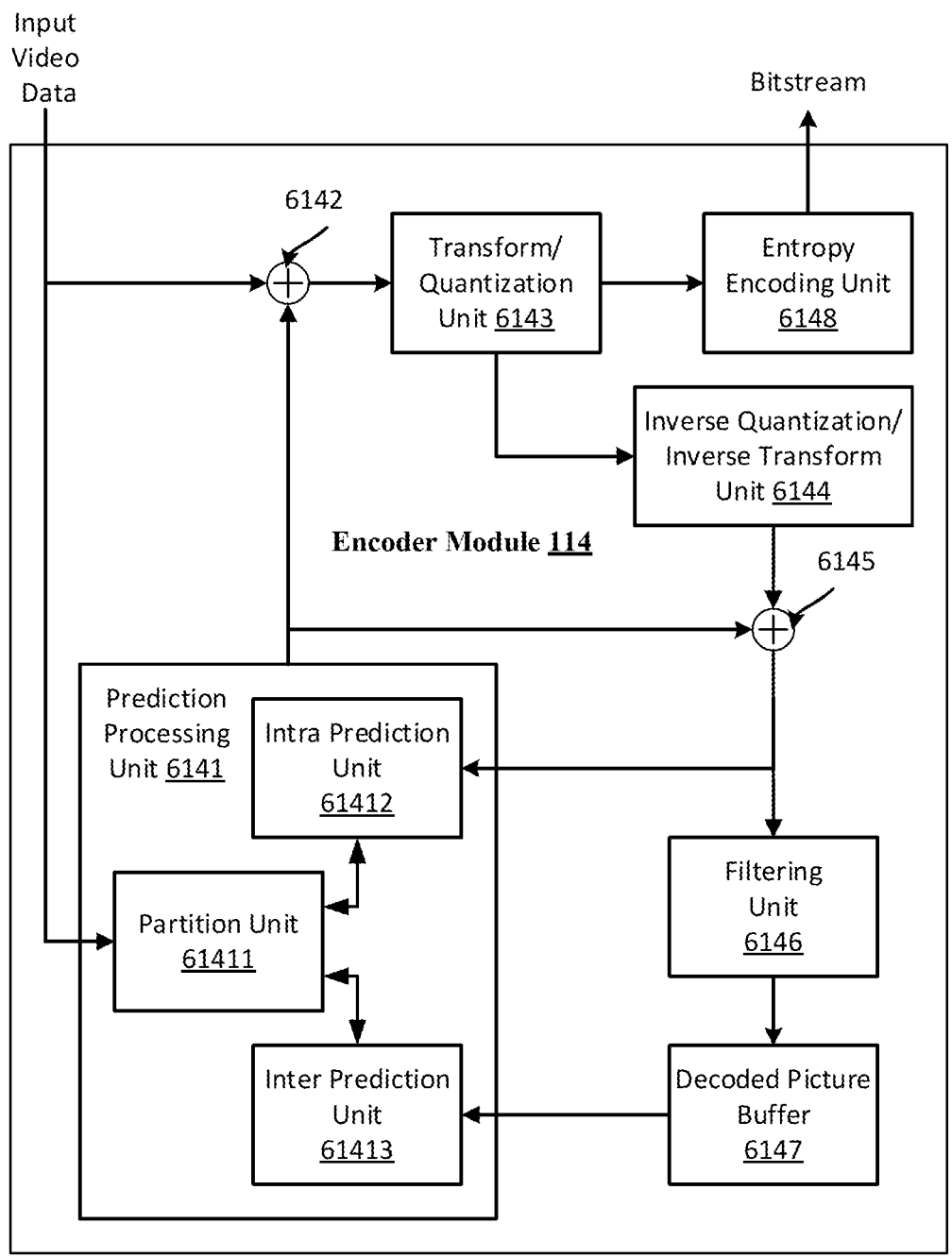
FIG. 6 is a block diagram illustrating the encoder module of the first electronic device illustrated in FIG. 1, according to an example implementation of the present disclosure.

FIG. 6 is a block diagram illustrating the encoder module 114 of the first electronic device illustrated in FIG. 1, according to an example implementation of the present disclosure. The encoder module 114 may include a prediction processor (e.g., prediction processing unit 6141), at least a first summer (e.g., first summer 6142) and a second summer (e.g., second summer 6145), a transform/quantization processor (e.g., transform/quantization unit 6143), an inverse quantization/inverse transform processor (e.g., inverse quantization/inverse transform unit 6144), a filter (e.g., filtering unit 6146), a decoded picture buffer (e.g., decoded picture buffer 6147), and an entropy encoder (e.g., entropy encoding unit 6148). The prediction processing unit 6141 of the encoder module 114 may further include a partition processor (e.g., partition unit 61411), an intra prediction processor (e.g., intra prediction unit 61412), and an inter prediction processor (e.g., inter prediction unit 61413).

The encoder module 114 may receive the source video and encode the source video to output a bitstream. The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, coding tree units (CTUs), coding blocks (CBs), sub-divisions thereof, and/or another equivalent coding unit.

In at least one implementation, the encoder module 114 may perform additional sub-divisions of the source video. It should be noted that the disclosed implementations are generally applicable to video coding regardless of how the source video is partitioned prior to and/or during the encoding.

In at least one implementation, during the encoding process, the prediction processing unit 6141 may receive a current image block of a specific one of the image frames. The current image block may be the luminance block or one of the chrominance blocks in the specific image frame.

The partition unit 61411 may divide the current image block into multiple block units. The intra prediction unit 61412 may perform intra-predictive coding of a current block unit relative to one or more neighboring blocks in the same frame as the current block unit in order to provide spatial prediction. The inter prediction unit 61413 may perform inter-predictive coding of the current block unit relative to one or more blocks in one or more reference image blocks to provide temporal prediction.

In at least one implementation, the prediction processing unit 6141 may select one of the coding results generated by the intra prediction unit 61412 and the inter prediction unit 61413 based on a mode selection method, such as a cost function. The mode selection method may be a rate-distortion optimization (RDO) process.

The prediction processing unit 6141 may determine the selected coding result and provide a predicted block corresponding to the selected coding result to the first summer 6142 for generating a residual block and to the second summer 6145 for reconstructing the encoded block unit. The prediction processing unit 6141 may further provide syntax elements such as motion vectors, intra-mode indicators, partition information, and other syntax information to the entropy encoding unit 6148.

In at least one implementation, the intra prediction unit 61412 may intra-predict the current block unit. The intra prediction unit 61412 may determine an intra prediction mode directed toward a reconstructed sample neighboring the current block unit in order to encode the current block unit.

In at least one implementation, the intra prediction unit 61412 may encode the current block unit using various intra prediction modes. The intra prediction unit 61412 or the prediction processing unit 6141 may select an appropriate intra prediction mode from the selected modes. The intra prediction unit 61412 may encode the current block unit using a cross-component prediction mode to predict one of the two chroma components of the current block unit based on the luma components of the current block unit. The intra prediction unit 61412 may predict a first one of the two chroma components of the current block unit based on the second of the two chroma components of the current block unit.

In at least one implementation, the inter prediction unit 61413 may inter-predict the current block unit as an alternative to the intra prediction performed by the intra prediction unit 61412. The inter prediction unit 61413 may perform motion estimation to estimate motion of the current block unit for generating a motion vector.

The motion vector may indicate a displacement of the current block unit within the current image block relative to a reference block unit within a reference image block. The inter prediction unit 61413 may receive at least one reference image block stored in the decoded picture buffer 6147 and estimate the motion based on the received reference image blocks to generate the motion vector.

In at least one implementation, the first summer 6142 may generate the residual block by subtracting the prediction block determined by the prediction processing unit 6141 from the original current block unit. The first summer 6142 may represent the component or components that perform this subtraction.

In at least one implementation, the transform/quantization unit 6143 may apply a transform to the residual block in order to generate a residual transform coefficient and then quantize the residual transform coefficients to further reduce the bit rate. The transform may be one of a DCT, DST, AMT, MDNSST, HyGT, signal dependent transform, KLT, wavelet transform, integer transform, sub-band transform or a conceptually similar transform.

In at least one implementation, the transform may convert the residual information from a pixel value domain to a transform domain, such as a frequency domain. The degree of quantization may be modified by adjusting a quantization parameter.

In at least one implementation, the transform/quantization unit 6143 may perform a scan of the matrix including the quantized transform coefficients. Alternatively, the entropy encoding unit 6148 may perform the scan.

In at least one implementation, the entropy encoding unit 6148 may receive multiple syntax elements from the prediction processing unit 6141 and the transform/quantization unit 6143 including a quantization parameter, transform data, motion vectors, intra modes, partition information, and other syntax information. The entropy encoding unit 6148 may encode the syntax elements into the bitstream.

In at least one implementation, the entropy encoding unit 6148 may entropy encode the quantized transform coefficients by performing CAVLC, CABAC, SBAC, PIPE coding or another entropy coding technique to generate an encoded bitstream. The encoded bitstream may be transmitted to another device (i.e., the second electronic device 120 in FIG. 1) or archived for later transmission or retrieval.

In at least one implementation, the inverse quantization/inverse transform unit 6144 may apply inverse quantization and inverse transformation to reconstruct the residual block in the pixel domain for later use as a reference block. The second summer 6145 may add the reconstructed residual block to the prediction block provided by the prediction processing unit 6141 in order to produce a reconstructed block for storage in the decoded picture buffer 6147.

In at least one implementation, the filtering unit 6146 may include a deblocking filter, a SAO filter, a bilateral filter, and/or an ALF to remove blocking artifacts from the reconstructed block. Additional filters (in loop or post loop) may be used in addition to the deblocking filter, the SAO filter, the bilateral filter and the ALF. Such filters are not illustrated for brevity and may filter the output of the second summer 6145.

In at least one implementation, the decoded picture buffer 6147 may be a reference picture memory that stores the reference block for use by the encoder module 114 to encode video, such as in intra- or inter-coding modes. The decoded picture buffer 6147 may include a variety of memory devices such as DRAM, including SDRAM, MRAM, RRAM), or other types of memory devices. The decoded picture buffer 6147 may be on-chip with other components of the encoder module 114 or off-chip relative to those components.

In at least one implementation, the encoder module 114 may perform the method 300 for encoding a video and reconstructing a block unit as illustrated in FIG. 3. The method 300 may be performed using the configurations illustrated in FIG. 1 and FIG. 6 and various elements of these figures are referenced with regard to the method 300. Each block illustrated in FIG. 3 may represent one or more processes, methods, or subroutines performed.

The order of blocks in FIG. 3 is illustrative only and may be different from what is illustrated. Additional blocks may be added or less blocks may be utilized without departing from the present disclosure.

At block 310, an encoder module 114 receives an image frame of video data. The video data may be video. With reference to FIGS. 1 and 6, the first electronic device 110 may receive the video via the source module 112. The encoder module 114 may determine the image frame from the video.

At block 320, an encoder module 114 determines a block unit having a block width and a block height based on the received video data. With reference to FIG. 1 and FIG. 6, the encoder module 114 may divide the image frame to determine the block unit. In at least one implementation, the prediction processing unit 6141 of the first electronic device 110 may determine the block unit from the video via the partition unit 61411 and the encoder module 114 may provide multiple partition indications into a bitstream based on a partition result of the partition unit 61411. In some implementations, the encoder module 114 may divide the image frames to generate multiple coding tree units and may further divide one of the coding tree units to determine the block unit (e.g., based on a video coding standard). With reference to FIGS. 4A-4C, the block height H410 is equal to the block width W410, the block width W430 is equal to 8×H430 and the block height H450 is equal to 4×W450.

At block 330, the encoder module 114 determines a comparison between the block width and the block height. With reference to FIG. 1 and FIG. 6, the encoder module 114 may determine the comparison between the block width and the block height based on an inequality. For example, a ratio value R between the block width Wb and the block height Hb is greater than or equal to a threshold value T (i.e., R≥T). The ratio value R between the width Wb and the block height Hb may be less than the threshold value T (i.e., R<T).

In at least one implementation, the encoder module 114 may determine a ratio parameter RP computed based on the block width Wb and the block height Hb. In at least one implementation, a first ratio parameter RP1 may be computed based on the block width Wb and the block height Hb by division. In some implementations, the first ratio parameter RP1 may be computed by dividing the block width Wb by the block height Hb (i.e., RP1=Wb/Hb) when the block width Wb is greater than or equal to the block height Hb. In some implementations, the first ratio parameter RP1 may be computed by dividing the block height Hb by the block width Wb (i.e., RP1=Hb/Wb) when the block width Wb is less than the block height Hb.

In at least one implementation, the second ratio parameter RP2 may be computed based on the block width Wb and the block height Hb by a logarithmic equation. In some implementations, one of the first ratio parameter RP1 and the second ratio parameter RP2 computed by different formulas may be set as the ratio parameter RP of the block unit. In at least one implementation, the second ratio parameter RP2 may be equal to an absolute value of a difference value generated by subtracting a base-2 logarithm of the block height from a base-2 logarithm of the block width (i.e., RP2=abs (log 2 Wb−log 2 Hb)). In some implementations, the first ratio parameter RP1 may be equal to two to the power of the second ratio parameter RP2.

In at least one implementation, the encoder module 114 may compare the ratio parameter RP with a ratio threshold RT. In some implementations, the encoder module 114 may determine that the comparison indicates that the ratio value R is greater than or equal to the threshold value T when the ratio parameter RP is greater than or equal to the ratio threshold RT. The encoder module 114 may determine that the comparison indicates that the ratio value R is less than the threshold value T when the ratio parameter RP is less than the ratio threshold RT.

In at least one implementation, the encoder module 114 may compare the ratio parameter RP with a first ratio threshold RT1 when the first ratio parameter RP1 is set as the ratio parameter RP. In at least one implementation, the encoder module 114 may compare the ratio parameter RP with a second ratio threshold RT2 when the second ratio parameter RP2 is set as the ratio parameter RP.

In some implementations, the encoder module 114 may determine that the comparison indicates that the ratio value R is greater than or equal to the threshold value T when the first ratio parameter RP1 is greater than or equal to the first ratio threshold RT1 or the second ratio parameter RP2 is greater than or equal to the second ratio threshold RT2. The encoder module 114 may determine that the comparison indicates that the ratio value R is less than the threshold value T when the first ratio parameter RP1 is less than the first ratio threshold RT1 or the second ratio parameter RP2 is less than the second ratio threshold RT2.

In at least one implementation, the first ratio threshold RT1 and the second ratio threshold RT2 may be a positive integer. In at least one implementation, the first ratio threshold RT1 may be equal to two to the power of n, and the number n is a positive integer. The first ratio threshold RT1 may be preset to 1, 2, 4 or 8, and the second ratio threshold RT2 may be preset to 1, 2, 3 or 4.

In at least one implementation, the first ratio threshold RT1 may be equal to two to the power of the second ratio threshold RT2 since the first ratio parameter RP1 is equal to two to the power of the second ratio parameter RP2. Therefore, the result of the comparison may be unchanged when the encoder module 114 changes the comparison from a first inequality RP1<RT1 to a second inequality RP2<RT2.

In at least one implementation, the encoder module 114 may compare the block width Wb with a first magnified value N1 computed by multiplying the block height Hb by the threshold value T and compare the block height Hb with a second magnified value N2 computed by multiplying the block width Wb by the threshold value T when the encoder module 114 determines the comparison between the block width Wb and the block height Hb.

In at least one implementation, the encoder module 114 may determine the comparison indicates that the ratio value R is less than the threshold value T when the block width Wb is less than the first magnified value N1 and the block height Hb is less than the second magnified value N2. In some other implementations, the encoder module 114 may determine the comparison indicates that the ratio value R is greater than or equal to the threshold value T when the block width Wb is greater than or equal to the first magnified value N1 or the block height Hb is greater than or equal to the second magnified value N2.

In at least one implementation, the threshold value T may be equal to the first ratio threshold RT1 when the encoder module 114 determines the comparison based on the first magnified value N1 and the second magnified value N2. The encoder module 114 may determine the comparison based on a third inequality Wb<N1=RT1×Hb and a fourth inequality Hb<N2=RT1×Wb.

In at least one implementation, the comparison determined based on the first inequality RP1=Wb/Hb<RT1 may be identical to the comparison determined based on the third inequality Wb<N1=RT1×Hb and the fourth inequality Hb<N2=RT1×Wb when the block width Wb is greater than the block height Hb. The comparison determined based on the first inequality RP1=Hb/Wb<RT1 may also be identical to the comparison determined based on the third inequality Wb<N1=RT1×Hb and the fourth inequality Hb<N2=RT1×Wb when the block width Wb is less than the block height Hb.

At block 340, the encoder module 114 determines whether a geometric partitioning mode is disabled for the block unit based on the comparison. The method 300 may proceed to block 350 when the encoder module 114 determines that the geometric partitioning mode is disabled for the block unit. The method may proceed to block 360 when the encoder module 114 determines the geometric partitioning mode is enabled for the block unit.

With further reference to FIG. 1 and FIG. 6, the encoder module 114 may determine that the geometric partitioning mode is disabled for the block unit when the comparison indicates that the ratio value R is greater than or equal to the threshold value T. The encoder module 114 may determine that the geometric partitioning mode is enabled for the block unit when the comparison indicates that the ratio value R is less than the threshold value T.

At block 350, the encoder module 114 predicts the block unit by using a first prediction mode different from the geometric partitioning mode to generate a predicted block. With further reference to FIG. 1 and FIG. 6, the encoder module 114 may generate multiple coding results generated by the intra prediction unit 61412 and the inter prediction unit 61413. Then, the encoder module 114 may select one of the coding results based on a mode selection method, such as a cost function. The mode selection method may be a rate-distortion optimization (RDO) process.

In at least one implementation, the encoder module 114 may select the first prediction mode from multiple option modes when the geometric partitioning mode is disabled for the block unit. In some implementations, the encoder module 114 may predict the block unit based on the first prediction mode to generate the predicted block when the comparison indicates that the ratio value R is greater than or equal to the threshold value T. Each of the option modes is different from the geometric partitioning mode. In at least one implementation, the option modes may include multiple merge candidate modes in a merge candidate list.

At block 360, the encoder module 114 predicts the block unit by using a second prediction mode selected from multiple candidate modes including the geometric partitioning mode to generate the predicted block. With further reference to FIG. 1 and FIG. 6, the encoder module 114 may generate the coding results generated by the intra prediction unit 61412 and the inter prediction unit 61413. Then, the encoder module 114 may select one of the coding results based on the mode selection method.

In at least one implementation, the encoder module 114 may select the second prediction mode from multiple candidate modes when the geometric partitioning mode is enabled for the block unit. In some implementations, the encoder module 114 may predict the block unit based on the second prediction mode to generate the predicted block when the comparison indicates that the ratio value R is less than the threshold value T. In at least one implementation, the candidate modes may include the option modes and the geometric partitioning modes.

At block 370, the encoder module 114 reconstructs the block unit based on the predicted block. In at least one implementation, the block unit may include multiple block elements. In some implementations, each of the block elements may be a pixel element. With further reference to FIG. 1 and FIG. 6, the encoder module 114 may determine multiple residual components by subtracting the predicted block from the block elements and provide the bitstream including multiple coefficients corresponding to the residual components. The encoder module 114 may return the residual components based on the coefficients, and add the returned residual components into the predicted block to generate a reconstructed block units.

The disclosed implementations are to be considered in all respects as illustrative and not restrictive. It should also be understood that the present disclosure is not limited to the specific disclosed implementations but that many rearrangements, modifications, and substitutions are possible without departing from the scope of the present disclosure.

What is claimed is:

1. A method of decoding a bitstream by an electronic device, the method comprising:

receiving an image frame of the bitstream;
determining a block unit having a block width and a block height based on the received image frame;
determining whether a geometric partitioning mode is disabled for the block unit based on a comparison between the block width and the block height, wherein:
the geometric partitioning mode is disabled for the block unit when the comparison between the block width and the block height indicates that a ratio value between the block width and the block height is greater than or equal to a threshold value,
the geometric partitioning mode is not disabled when the comparison between the block width and the block height indicates that the ratio value is less than the threshold value,
the block width is compared with a first magnified value generated by multiplying the block height by the threshold value,
the block height is compared with a second magnified value generated by multiplying the block width by the threshold value,
the comparison between the block width and the block height indicates that the ratio value is less than the threshold value when the block width is less than the first magnified value and the block height is less than the second magnified value,
the comparison between the block width and the block height indicates that the ratio value is greater than or equal to the threshold value when the block width is greater than or equal to the first magnified value,
the comparison between the block width and the block height indicates that the ratio value is greater than or equal to the threshold value when the block height is greater than or equal to the second magnified value,
the threshold value is equal to 8,
if the block width is equal to 64 and the block height is equal to one of 128, 64, 32, or 16, the geometric partitioning mode is not disabled,
if the block width is equal to 64 and the block height is equal to 8, the geometric partitioning mode is disabled,
if the block height is equal to 64 and the block width is equal to one of 128, 64, 32, or 16, the geometric partitioning mode is not disabled,
if the block height is equal to 64 and the block width is equal to 8, the geometric partitioning mode is disabled, and
the block unit is divided to generate a plurality of sub-blocks predicted by different merge candidates of the block unit when the geometric partitioning mode is applied on the block unit;
generating a predicted block by predicting the block unit based on a prediction mode different from the geometric partitioning mode when the geometric partitioning mode is disabled for the block unit; and
reconstructing the block unit based on the predicted block.

2. The method according to claim 1, further comprising:
determining a ratio parameter generated based on the block width and the block height;
comparing the ratio parameter with a ratio threshold;
determining that the comparison between the block width and the block height indicates that the ratio value is greater than or equal to the threshold value when the ratio parameter is greater than or equal to the ratio threshold; and
determining that the comparison between the block width and the block height indicates that the ratio value is less than the threshold value when the ratio parameter is less than the ratio threshold.

3. The method according to claim 2, wherein:
the ratio parameter is determined by dividing the block width by the block height when the block width is greater than the block height, and
the ratio parameter is determined by dividing the block height by the block width when the block height is greater than or equal to the block width.

4. The method according to claim 2, wherein the ratio parameter is equal to an absolute value of a difference value generated by subtracting a base-2 logarithm of the block height from a base-2 logarithm of the block width.

5. The method according to claim 1, further comprising:
determining a partition index, a first merge index, and a second merge index of the block unit when the block unit is predicted by the geometric partitioning mode;
dividing the block unit to generate a first sub-block and a second sub-block based on the partition index; and
predicting the first sub-block by a first merge mode selected from a plurality of merge candidates based on the first merge index and predicting the second sub-block by a second merge mode selected from the plurality of merge candidates based on the second merge index to generate the predicted block.

6. A method of decoding a bitstream by an electronic device, the method comprising:
receiving an image frame of the bitstream;
determining a block unit having a block width and a block height based on the received image frame;
determining a comparison between the block width and the block height, wherein:
the geometric partitioning mode is disabled for the block unit when the comparison between the block width and the block height indicates that a ratio value between the block width and the block height is greater than or equal to a threshold value,
the geometric partitioning mode is not disabled when the comparison between the block width and the block height indicates that the ratio value is less than the threshold value,
the block width is compared with a first magnified value generated by multiplying the block height by the threshold value,
the block height is compared with a second magnified value generated by multiplying the block width by the threshold value,
the comparison between the block width and the block height indicates that the ratio value is less than the threshold value when the block width is less than the first magnified value and the block height is less than the second magnified value,
the comparison between the block width and the block height indicates that the ratio value is greater than or equal to the threshold value when the block width is greater than or equal to the first magnified value,
the comparison between the block width and the block height indicates that the ratio value is greater than or equal to the threshold value when the block height is greater than or equal to the second magnified value,
the threshold value is equal to 8,
if the block width is equal to 64 and the block height is equal to one of 128, 64, 32, or 16, the geometric partitioning mode is not disabled, if the block width is equal to 64 and the block height is equal to 8, the geometric partitioning mode is disabled, if the block height is equal to 64 and the block width is equal to one of 128, 64, 32, or 16, the geometric partitioning mode is not disabled, and if the block height is equal to 64 and the block width is equal to 8, the geometric partitioning mode is disabled;

generating a predicted block by predicting the block unit based on a first prediction mode different from a geometric partitioning mode when the comparison between the block width and the block height indicates that a ratio value between the block width and the block height is greater than or equal to a threshold value, wherein the block unit is divided to generate a plurality of sub-blocks predicted by different merge candidates of the block unit when the geometric partitioning mode is applied on the block unit; and reconstructing the block unit based on the predicted block.

7. The method according to claim 6, further comprising:
determining a ratio parameter generated based on the block width and the block height;
comparing the ratio parameter with a ratio threshold; and
determining that the comparison between the block width and the block height indicates that the ratio value is greater than or equal to the threshold value when the ratio parameter is greater than or equal to the ratio threshold.

8. The method according to claim 7, wherein:
the ratio parameter is determined by dividing the block width by the block height when the block width is greater than the block height, and
the ratio parameter is determined by dividing the block height by the block width when the block height is greater than or equal to the block width.

9. The method according to claim 7, wherein the ratio parameter is equal to an absolute value of a difference value generated by subtracting a base-2 logarithm of the block height from a base-2 logarithm of the block width.

10. The method according to claim 7, further comprising:
determining that the comparison between the block width and the block height indicates that the ratio value is less than the threshold value when the ratio parameter is less than the ratio threshold; and
generating the predicted block by predicting the block unit based on a second prediction mode selected from a plurality of candidate modes including the geometric partitioning mode when the comparison between the block width and the block height indicates that the ratio value is less than the threshold value.

11. The method according to claim 6, further comprising:
determining that the comparison between the block width and the block height indicates that the ratio value is less than the threshold value when the block width is less than the first magnified value and the block height is less than the second magnified value; and
predicting the block unit to generate the predicted block by using a second prediction mode selected from a plurality of candidate modes including the geometric partitioning mode when the comparison between the block width and the block height represents that the ratio value is less than the threshold value.

12. An electronic device for decoding a bitstream, the electronic device comprising:
at least one processor; and
at least one non-transitory computer-readable medium coupled to the at least one processor and storing one or more computer-executable instructions that, when executed by the at least one processor, cause the electronic device to:

receive an image frame of a bitstream;

determine a block unit having a block width and a block height based on the received image frame;

determine a comparison between the block width and the block height, wherein:
the geometric partitioning mode is disabled for the block unit when the comparison between the block width and the block height indicates that a ratio value between the block width and the block height is greater than or equal to a threshold value,
the geometric partitioning mode is not disabled when the comparison between the block width and the block height indicates that the ratio value is less than the threshold value,
the block width is compared with a first magnified value generated by multiplying the block height by the threshold value,
the block height is compared with a second magnified value generated by multiplying the block width by the threshold value,
the comparison between the block width and the block height indicates that the ratio value is less than the threshold value when the block width is less than the first magnified value and the block height is less than the second magnified value,
the comparison between the block width and the block height indicates that the ratio value is greater than or equal to the threshold value when the block width is greater than or equal to the first magnified value,
the comparison between the block width and the block height indicates that the ratio value is greater than or equal to the threshold value when the block height is greater than or equal to the second magnified value,
the threshold value is equal to 8,
if the block width is equal to 64 and the block height is equal to one of 128, 64, 32, or 16, the geometric partitioning mode is not disabled,
if the block width is equal to 64 and the block height is equal to 8, the geometric partitioning mode is disabled,
if the block height is equal to 64 and the block width is equal to one of 128, 64, 32, or 16, the geometric partitioning mode is not disabled, and
if the block height is equal to 64 and the block width is equal to 8, the geometric partitioning mode is disabled;

generate a predicted block by predicting the block unit based on a first prediction mode different from a geometric partitioning mode when the comparison between the block width and the block height indicates that a ratio value between the block width and the block height is greater than or equal to a threshold value, wherein the block unit is divided to generate a plurality of sub-blocks predicted by different merge candidates of the block unit when the geometric partitioning mode is applied on the block unit; and reconstruct the block unit based on the predicted block.

13. The electronic device according to claim 12, wherein the one or more computer-executable instructions, when executed by the at least one processor, further cause the electronic device to:

determine a ratio parameter generated based on the block width and the block height;

compare the ratio parameter with a ratio threshold; and determine that the comparison indicates that the ratio value is greater than or equal to the threshold value when the ratio parameter is greater than or equal to the ratio threshold.

14. The electronic device according to claim 13, wherein:

the ratio parameter is determined by dividing the block width by the block height when the block width is greater than the block height, and the ratio parameter is determined by dividing the block height by the block width when the block height is greater than or equal to the block width.

15. The electronic device according to claim 13, wherein the ratio parameter is equal to an absolute value of a difference value generated by subtracting a base-2 logarithm of the block height from a base-2 logarithm of the block width.

16. The electronic device according to claim 13, wherein the one or more computer-executable instructions, when executed by the at least one processor, further cause the electronic device to:

determine that the comparison indicates that the ratio value is less than the threshold value when the ratio parameter is less than the ratio threshold; and generate the predicted block by predicting the block unit based on a second prediction mode selected from a plurality of candidate modes including the geometric partitioning mode when the comparison represents that the ratio value is less than the threshold value.

17. The electronic device according to claim 12, wherein the one or more computer-executable instructions, when executed by the at least one processor, further cause the electronic device to:

determine that the comparison indicates that the ratio value is less than the threshold value when the block width is less than the first magnified value and the block height is less than the second magnified value; and generate the predicted block by predicting the block unit based on a second prediction mode selected from a plurality of candidate modes including the geometric partitioning mode when the comparison indicates that the ratio value is less than the threshold value.

* * * * *